April 27, 1926.

A. LAUB

CHANGE SPEED GEAR

Filed April 3, 1925

Inventor
A. Laub
by Langner, Parry, Card & Langner
Attys.

Patented Apr. 27, 1926.

1,582,480

UNITED STATES PATENT OFFICE.

ADOLF LAUB, OF BASEL, SWITZERLAND, ASSIGNOR TO THE FIRM PROGRESSION SOCIÉTÉ ANONYME, OF LA CHAUX-DE-FONDS, SWITZERLAND.

CHANGE-SPEED GEAR.

Application filed April 3, 1925. Serial No. 20,493.

*To all whom it may concern:*

Be it known that I, ADOLF LAUB, a citizen of the Swiss Republic, and resident of Basel, Switzerland, have invented new and useful Improvements in Change-Speed Gears, of which the following is a full, clear, and exact specification.

The invention relates to a change speed gear provided with clutch members movable eccentrically with respect to the rotary shaft of the gear, the clutch members transmitting the motion of the driving element to the driven element by their frictional engagement in a conical groove. The said clutch members or teeth arranged round about are pressed one after the other into frictional engagement in said conical groove by a control ring serving as a guide therefor, disengaging means being provided to adjust the control ring in such a manner that it holds the clutch members or teeth in a freely running position so as to prevent their engagement.

The drawing illustrates a form of construction of the change speed gear according to the present invention.

On the driving shaft $a$ is fastened a driving disc $b$, in which radial grooves $b^1$ are provided. In these grooves the quadrilateral heads $c^1$ of laterally projecting pins $c$ are radially adjustable, to which are fastened the radial conical teeth $d$. The pins $c$ are provided with rollers $c^2$ and $c^3$, by which they are guided on annular races of a control ring $f$ so that they remain parallel to the shaft $a$ during the rotation of the driving disc $b$, in which rotation they participate. The annular set of teeth $d$ forms the actual clutch members for transmitting the motion, and is disposed eccentrically within an inner ring $h$ fast to the pulley $g$ to be driven. The ring $h$ is formed with a conical groove $h^1$ on its inner side, this groove being in the radial plane of the teeth $d$. The control ring $f$ is acted upon by two springs $k$, which are supported on a stationary part within the pulley $g$, so that it is urged in one direction towards the ring $h$ to press the teeth $d$ on one side into frictional engagement with the annular groove $h^1$ of the ring $h$ and on the diametrically opposite side right out of engagement with the same, as is shown in Figure 1, so that the movement of the teeth $d$ out of their disengaged position into their engaged position takes place with gradually increasing friction.

Figure 3:
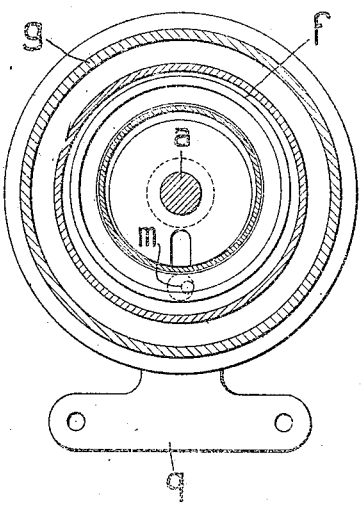
Figure 3 is a cross section through the line C—D of Figure 1.
Figure 4:
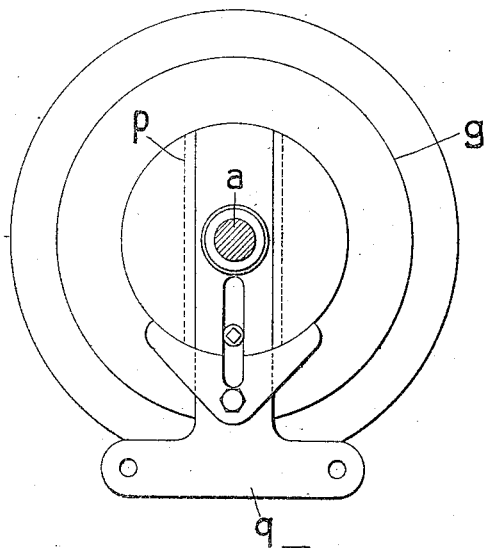
Figure 4 is a rear view.

The control ring $f$ can be moved against the action of the springs $k$ by a rotary eccentric pin $m$ (Figure 3) so that the teeth $d$ are held completely out of engagement with the annular groove $h^1$. In this position the pulley is loose.

The pulley $g$ together with all the parts carried by it can be moved along a dovetailed guide $p$ of a stationary support $q$ in the direction of a diameter of the pulley, which gives rise to no difficulties for the case where the pulley belt runs at an angle to this direction of movement. By this arrangement the set of the teeth $d$, which participates in the movement, is so positioned in relation to its eccentricity to the shaft $a$, that the teeth $d$ in the driving position, at the top in Figure 1, come into action on a greater or smaller radius, thus giving a corresponding gear ratio.

Figure 2:
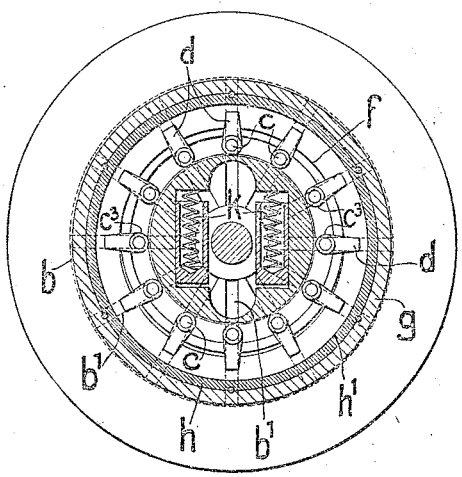
Figure 2 is a cross section through the line A—B of Figure 1.
Figure 1:
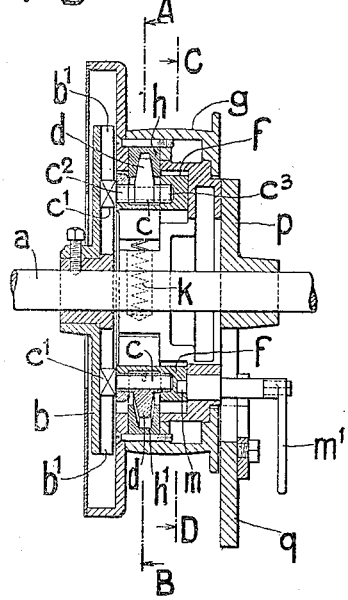
Figure 1 is an axial section of the change speed gear.

On rotation of the driving disc $b$ the teeth $d$ one after the other enter increasingly deeper into the annular groove $h^1$ of the ring $h$, until they reach the deepest possible position at the top in Figure 1. In this position they are coupled to the ring $h$ and transmit their movement to the same and thus to the pulley $g$. The same action repeats itself for every tooth $d$ and a continuous rotation is obtained for the pulley $g$. If the pulley is to be freed, which can be effected at any time, the eccentric pin $m$ is turned by handle $m^1$ so that the control ring $f$ and therefore the teeth $d$ are adjusted to a position concentric with the grooved ring $h$, thus disengaging the teeth $d$ from the groove $h^1$ so that they can freely rotate therein.

What I claim is:—

1. A change speed gear, comprising a rotary driving element, a rotary driven element, interconnecting pieces between them, radial guidings for said pieces, an annular set of conical friction clutch teeth in rotational relation with said interconnecting pieces, an annular friction groove on one of said rotary elements adapted to receive successively said friction clutch teeth, a controlling guide ring to guide the latter so as to allow the same to progressively enter said friction groove to produce an operative frictional connection thereon, and adjusting means for said guide ring to adjust the clutch teeth to a freely running position with respect to said friction groove.

2. A change speed gear, comprising a rotary driving element, a rotary driven element, interconnecting pieces between them, radial guidings for said pieces, an annular set of conical friction clutch teeth in rotational relation with said interconnecting pieces, an annular friction groove on one of said rotary elements adapted to receive successively said friction clutch teeth, a controlling guide ring to guide the latter eccentrically with regard to said friction groove for their successive frictional engagement with said groove, spring means urging said guide ring in the direction of frictional engagement of the clutch teeth, and adjusting means for said guide ring to adjust the clutch teeth to a concentric inoperative position with respect to said friction groove.

In witness whereof I have hereunto signed my name this 23rd day of March 1925.

ADOLF LAUB.